H. PANTON.
Treating Tin Scraps and obtaining Useful Products.

No. 135,578. Patented Feb. 4, 1873.

Witnesses,

Inventor,
Henry Panton

UNITED STATES PATENT OFFICE.

HENRY PANTON, OF NEW YORK, N. Y.

IMPROVEMENT IN TREATING TIN SCRAPS AND OBTAINING USEFUL PRODUCTS.

Specification forming part of Letters Patent No. 135,578, dated February 4, 1873.

*To all whom it may concern:*

Be it known that I, HENRY PANTON, of the city, county, and State of New York, have made certain new and useful Improvements in the Utilization of Waste Tin-Plate Scraps, whereby defects in the processes heretofore practiced are remedied and superior products obtained.

Figure 1:
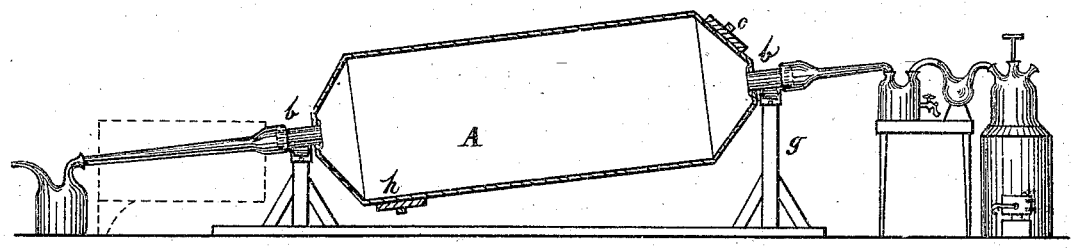
Figure 3:
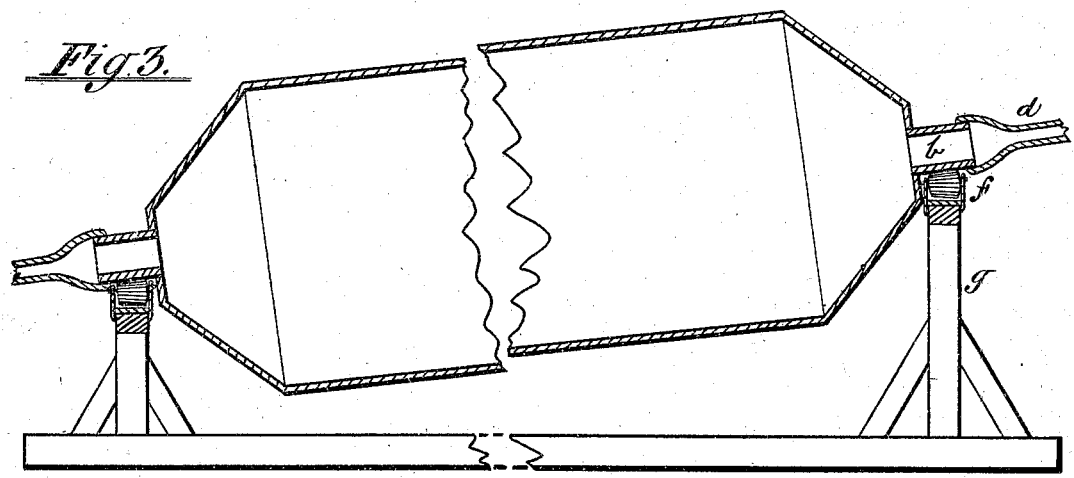
Figure 2:
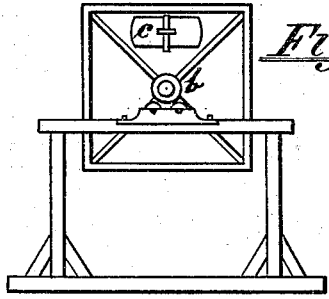

The first step or part of my invention relates to the conversion of the tin on the tin-plate scraps into bichloride of tin by subjecting them to the action of dry chlorine gas in a rectangular box of iron suspended on cast hollow journals of the same metal, as shown in Fig. 1 at $b$ $b$, A in the figure representing the rectangular box. In this box the tin-plate scraps to be treated are inserted through a man-hole at $c$, which is afterward tightly closed by a lid. Over the end of the cast-iron journal is fitted a cap, which allows the journal to turn in it. From this cap a lead pipe leads to a wolf-bottle containing fused chloride of calcium, and from the latter a lead pipe to a second wolf-bottle containing a small quantity of water, and then to the retort for generating chlorine gas. Fig. 2 shows the end of the iron box with man-hole and journal. Fig. 3 is an enlarged side view of the same, of which $b$ is the cast-iron journal, and $d$ the cap fitting over the same. $f$ represents one of two friction-rollers, on which the cast-iron journal revolves. $g$ represents a frame supporting the whole. The opposite and lower end of the box, which is inclined at an angle of about fifteen degrees, is a counterpart of the end just described. Over the journal at this end is fitted a cap leading to a straight lead pipe, which serves as a condenser, passing through a box containing water. At the lower end of this tube a wolf-bottle is adjusted for receiving the bichloride of tin. Fig. 3 shows an enlarged view of the lower end of the box and journal. At the lower side of the box A, Fig. 1, at $h$, is a man-hole, of size and construction the same as at $c$, for the purpose of discharging the scraps after treatment.

The size of the rectangular box which I prefer is five feet square by ten feet long, having a capacity of two hundred and fifty cubic feet, and holding of the refuse scraps, when charged, about three thousand pounds.

The chlorine-generator is composed of a cast-iron flask, the upper part of which is removable, and rests in a groove in the lower section, so arranged that it may be luted to render it gas-tight. The lower section is lined with lead. The proportions of four parts of chloride of sodium mixed intimately with three parts of fine pulverized black oxide of manganese are placed in the generator. Onto this is poured a mixture of seven parts by weight of strong sulphuric acid diluted with seven parts of water, the mixture having been sometime previously made and allowed to cool. The connections of the generator with the rectangular box having been made, as above described, and the condensing-pipe adjusted, a moderate fire is made under the generator, and the mixture of acid, manganese, and salt is from time to time agitated by means of the stirrer. The chlorine gas liberated passes over into the box, unites with the tin, forming bichloride of tin, which, from the heat resulting from the chemical action, is in the form of vapor, and passes off to the condenser, where it becomes a liquid and falls into the wolf-bottle placed to receive it. The process of the operation may be observed at the end of the condenser when the process is working. Properly there is no indication of free chlorine, but when the process is completed free chlorine passes over into the wolf-bottle, where it may be observed by its green color. During the process the rectangular box is occasionally revolved, for the purpose of agitating and turning over the scraps so that all parts of them may be exposed to the action of the chlorine gas. When all the tin has been removed by the chlorine, carbonic-acid gas or atmospheric air is forced into the upper end of the box, and any remaining vapor of bichloride of tin is driven into the condenser, while the carbonic-acid gas or air escapes through the wolf-bottle.

I would here remark that it is better to pass the carbonic-acid gas or air over fused chloride of calcium to free it from any moisture before passing it into the box.

The man-holes are then opened and the scraps removed, and the process repeated. The bichloride of tin in the wolf-bottle practice has proved to be chemically pure. A solution of this is made with water, and the tin precipitated by common chalk, or lime, as an oxide. The liquid portion is drawn off, the oxide dried, mixed with powdered charcoal, placed in a crucible, and reduced to metallic tin. The chloride of calcium in the solution is obtained by evaporating the water.

Figure 4:
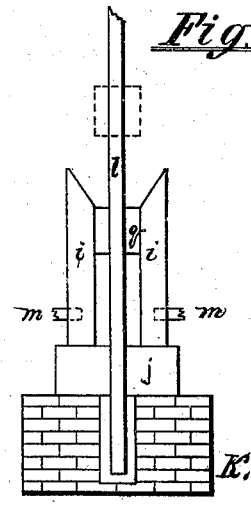
Figure 5:
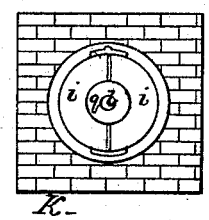

The second part of my improvements relates to the conversion of the scraps into wrought-iron bar or cast-steel. To do this I provide an apparatus or stamping-mold, as shown in Fig. 4, of which Fig. 5 is a plan view. $i\ i$ represent a hollow cast-iron cylinder, the bore of which is six inches in diameter, and the sides at least four inches thick and twenty-one inches high. The inner side has a flare, making the top of a funnel shape. The bottom of this cylinder is level, and rests on the face of a cast-iron anvil, $j$, about six inches thick, with a bore two inches in diameter through its whole thickness. This rests on a stone foundation, $k$. A piston, $l$, two inches in diameter, having a hammer attached to it, as shown at $q$, which hammer fits somewhat loosely in the bore, passes down through the anvil and into a space left in the stone foundation. This piston is lifted to a suitable elevation by means of any hoisting device, but not so high as to bring its lower end out of the anvil. The scraps which have been freed from tin, as described in the first part of the process, are fed into the cylinder below the hammer, which is allowed to drop, when it is again elevated and another batch added, and thus repeated until a hollow cylinder from the scraps has been densely formed of about one foot in height. In order to remove this cylinder of scraps a provision is made, which I will now describe. The cylinder $i\ i$ is divided longitudinally into two equal halves or sections, strongly hinged on one side, so that they may be spread apart by handles at $m\ m$. On the opposite side of the hinges are strong clasps for holding the mold together while being filled to form the ingot. The piston is elevated sufficiently to clear the ingot, the clasps unfastened, the mold or cylinder opened, when the ingot may be removed. The cylinder is closed again and the operation repeated. The next step for converting these ingots into cast-steel is to place them into a "forty-pound" plumbago crucible, which the hollow ingots have been proportioned to fit. The powdered charcoal, pyrolusite, manganese, or other required ingredients, are placed in the hollow provided for them in the center of the ingot. The whole is then sprinkled over with powdered brick-dust in the usual manner practiced in preparing batches from nuggets of bar-iron in making ingots of cast-steel. The crucible is now placed in the furnace, the contents melted and cast into ingots, when it is forged, rolled, drawn, or treated in the usual manner practiced in working steel.

When the object is to convert these scrap-ingots into wrought-bar iron, they are placed on the hearth of a puddling-furnace and heated to a welding heat, when the puddler, through the puddling-holes of the furnace, works a number of them together into one mass or bloom; it is then removed from the furnace to the squeezers commonly employed in iron-forges, and kneaded into a homogeneous mass, when it is removed to the grooved rollers now in use for rolling bar-iron, and rolled into bars.

In order that my improvements may be clearly appreciated I will here remark that the utilization of tin-plate scraps has been a subject of much consideration and experimenting during many years past; and several patents have been obtained by different parties in England and the United States for processes which have reached the objects of their design with various degrees of completeness. The treatment of the tin-plate scraps on a large scale, by immersing them in dilute acids, is attended with great inconvenience and detriment to the health of the workmen, while the salts of tin resulting in such cases always contain iron, the separation of which is laborious and expensive. The iron, too, is in a corroded condition, which makes it difficult of management in the after treatment, especially when it is to be aggregated into a homogeneous mass for the forming of bars or sheets; and more especially is this true when it is designed for forming cast-steel. Dry chlorine gas removes the tin perfectly, leaving the iron in a clean, uncorroded condition, ready to be worked, in the most satisfactory manner, into wrought-iron masses or converted into steel. Mr. James Higgins obtained a patent in England, which bears date of April 4, 1854, for treating tin-plate scraps in a closed vessel with dry heated chlorine gas, and thus forming bichloride of tin, which he condensed in water. Mr. D. D. Parmelee obtained a patent in the United States, dated April 19, 1870, for a vertical cylinder with a perforated interior cylinder of a form or construction, described in his patent, to hold the tin-plate scraps; the whole to be inclosed while dry chlorine gas was passed into the receptacle, forming bichloride of tin, which was condensed by its passing through a straight tube surrounded by water, and, lastly, collected in a wolf-bottle as a liquid, or received in water, forming a hydrated bichloride of tin. Mr. Charles A. Seely obtained a patent of the United States, dated May 28, 1872, for a treating-tank, consisting of a cylinder standing vertically, having a cover and bottom with a "liquid seal," so that both may be movable—the former to admit the charge of tin-plate scraps, the latter to discharge them after treatment with dry chlorine gas—and for a combination of a series of these tanks to operate together or alternately, and for the removal of the bichloride of tin, on the completion of the operation, by means of a current of heated air.

It has been practically discovered by me that, in order to completely remove the tin from the iron, which it is very necessary to do, it is required that the scraps be turned over occasionally or agitated while the chlorine is acting, in order to bring those parts of the scraps which were together in contact with the gas. The want of any provision for this in the apparatus employed by the patentees above named prevents the completeness of the removal of the tin, and greatly impairs the quality of the iron or steel formed ultimately of the iron portion of the scraps. Furthermore, in the use of the vertical cylinder employed by the process of Mr. Seely, when the liquid seal is water the bichloride comes in contact with it, forming constantly hydrated vapors, which condense within the tank on the scraps, preventing the full action of the chlorine on the tin, retarding the process, and prolonging the time which would otherwise be required to complete the chemical action. The use of "acid seals" for lids and bottoms is attended with great inconvenience to the workmen in charge of the apparatus, as, when the bottom is removed, the acid is necessarily spilled and lost on the floor or foundation, while the top or lid seal of acid comes in contact with their hands, producing painful corrosions. It has also been practically discovered by me that the action of the chlorine on the tin of the tin-plate scraps is much more active or rapid and complete when the mass of scraps is spread over a greater surface, and of less height, for the reason that all the bichloride formed on the top falls and presses over the scraps below, forming an envelope or shield to the tin from the action of the chlorine. This is especially the case in the apparatus of Mr. Parmelee. In my improvements I have remedied these defects, and completed a process which provides the details necessary for a complete practical process.

I will further remark that the putting of the scraps into ingots by hammering or ramming them into molds, I am aware, is not new. Mr. D. D. Parmelee obtained a patent of the United States, dated June 29, 1869, for "interlacing" tin scraps by means of an apparatus which wound them into a kind of twist, which was placed in a long cast-iron mold and rammed down to a somewhat compact ingot very much in the manner that a cartridge is forced into a cannon. These rolls were mixed with cast-iron and melted in a cupola-furnace to form pig-iron. The quality of the iron thus formed is of the kind that is known in the market as white pig-iron. It is quite hard, and commands the lowest price. The scrap cylinders thus formed by twisting and ramming were not suitable for putting into the crucibles employed for making cast-steel ingots; nor were they of sufficient compactness to be cut into "nuggets," like bar-iron, to be economically melted in the steel pots or crucibles, for the reason that their bulk of the required weight in this case was too great. The weight of each charge in a crucible is an important matter in the melting of steel, for the pots sustain only a limited number of meltings, and constitute, accordingly, an important item of expense in the making of steel.

I am enabled by my improvement to form a compact ingot of a size which may be inserted in the steel-pots now in use, and which have been adopted on account of their convenience of form, and their capacity for holding a charge of weight practicable for the melters to lift and manage. This ingot is not only of the suitable form for the crucible, but is of the required weight, and indispensably has a bore in its center for the insertion of powders or chemicals required for the conversion of the iron into steel, and the usual fluxes and ingredients for purifying it.

The apparatus and conditions which I have described constitute a complete and practical process, whereby all the tin is utilized in a chemically pure condition, and all the iron converted into a merchantable form to subserve the various purposes for which iron and steel are employed.

I do not claim the use of chlorine gas for removing the tin as of my invention, as this was employed by Mr. Higgins, as I have referred to in a preceding paragraph; also, later by Mr. Parmelee; and afterward by Mr. Seely. Nor do I claim the use of carbonic-acid gas or atmospheric air to remove the last portion of the bichloride of tin, as these have been used for displacement long since, for the purpose of displacing the bichloride of tin not only, but in other processes; as that of removing benzine in gas form from tanks in which resins have been dissolved out of refuse products, leaving the insoluble portion to be separated by decantation, and finally separating the resin by distillation of the benzine. Carbonic acid has likewise been employed for a similar purpose. Nor do I claim, broadly, the making of compact ingots of tin-plate scrap-iron.

What I claim as my invention, and for which I desire Letters Patent of the United States, is—

1. A treating-chamber which, by being made to revolve, will agitate and turn the tin-plate scraps within it over, so as to expose all parts of their surface to the action of chlorine gas.

2. The rectangular-shaped chamber or receptacle, supported, at an inclination of a few degrees, by hollow journals turning between friction-rollers, on a frame, and having at the upper end a man-hole, and on one of the sides, near the lower end, a second man-hole—the first through which to charge the chamber, the second to discharge its contents—all arranged and constructed substantially as described.

3. The compact hollow ingot of treated tin-plate scraps, of about the proportions described, and for the insertion of the powdered charcoal, pyrolusite, and other ingredients used in the manufacture of cast-steel, substantially as described.

4. The combination of a revolving treating-chamber with a chlorine-generator and a condenser, as and for the purpose set forth.

5. The mold herein described for forming hollow ingots of scrap-iron, composed of the sides $i\ i$, perforated anvil $j$, piston $l$, and hammer $q$, combined and arranged to operate as set forth.

HENRY PANTON.

Witnesses:
   CHAS. H. KITCHEL,
   SAML. G. JOLLIFFE.